Patented June 16, 1936

2,044,572

UNITED STATES PATENT OFFICE 2,044,572

COMPOSITIONS AND METHOD OF PRODUCING

Cleveland B. Hollabaugh, Wilmington, Del., assignor to Hercules Powder Company, Wilmington, Del., a corporation of Delaware No Drawing. Application December 1, 1934, Serial No. 755,636

7 Claims. (Cl. 134—79)

This invention relates to an improvement in compositions and method of producing same and more specifically relates to compositions of the type generally known as lacquer and lacquer enamel, adapted for application by spraying, dipping, or brushing.

Heretofore in connection with compositions of the type contemplated by this invention, it has been desired to have a composition containing a maximum solids content, while at the same time having a fluidity enabling it to be effectively applied by usual methods, such as brushing, spraying, dipping, and the like. In compositions of the type of lacquer and lacquer enamels, which include nitrocellulose as a base and usually in addition thereto various ingredients, such as a plasticizer, a gum or resin, a pigment, and the like, difficulty has been met in providing a composition of high solids content with retention of desired fluidity, due to the fact that nitrocellulose when dissolved in its usual solvents, tends to give a viscous as compared with a fluid solution where it is dissolved in any substantial concentration.

Various efforts have been made to produce compositions of the type of lacquer and lacquer enamel, containing nitrocellulose, with increased solids content and desired fluidity. The chief effort in such direction has been through the medium of reduction of the so-called viscosity characteristic of the nitrocellulose whereby an increased quantity thereof can be dissolved in a given amount of a solvent or solvent mixture without decrease of the fluidity of the resultant solution. Compositions of the type indicated and including nitrocellulose of reduced viscosity have been found desirable for many uses, but are not entirely satisfactory due to the fact that there are definite limits upon the increase in solids content, without undesirable decrease of fluidity, which may be obtained through the use of nitrocellulose of reduced viscosity characteristic; and due to the fact that nitrocellulose of reduced viscosity characteristic is incapable of forming as strong and durable a film as is nitrocellulose of relatively high viscosity, it being well known that nitrocellulose of relatively high viscosity characteristic will produce a film of superior strength, flexibility and durability as compared with nitrocellulose the viscosity characteristic of which has been reduced to enable increase in the solids content of a coating composition without undesirable decrease in fluidity.

Heretofore it has been suggested that nitrocellulose solutions be emulsified in water and various prior disclosures of nitrocellulose solutions and of lacquers emulsified in water exist. However, prior aqueous emulsions of nitrocellulose solutions, and which have been variously of the water-in-oil and of the oil-in-water type have proved entirely unsuited for use as lacquers or lacquer enamels for the formation of protective or decorative coatings, more particularly, because it has been impossible to produce with the use of such emulsions clear, durable films and variously because such emulsions have been lacking in requisite stability.

Now in accordance with this invention a composition of the type of lacquer and lacquer enamel is provided and which is characterized by high solids content, with the use of nitrocellulose of either relatively high or relatively low viscosity characteristic and, at the same time, having desired fluidity adapting it for application by spraying, dipping, brushing, or the like.

Further, the composition in accordance with this invention will be capable of producing a film having great strength, flexibility and durability, due to the fact that high viscosity nitrocellulose may be used, and also films may be produced of very substantial greater thickness than heretofore produced with lacquers; all with great economy, more particularly in the amount of solvent required.

Further, clear coatings of high gloss, resistant to water and weather may be produced and, at the same time, pigmented films or coatings may be produced which will be relatively smooth or free from orange peel, and capable of polishing to a high gloss with a great deal less treatment, as by sanding, than in the case of prior pigmented films or coatings of the type.

The composition will be found to be of especial advantage for application by brushing due to the fact that during the brushing on of a second coat over a previously applied coat, the solvents in the composition cannot attack the previously applied coat as they tend to do in the case of previously known lacquers, at the same time when the water has evaporated from the composition the solvents will be free to operate to bond the coats.

Further, and more particularly, the composition in accordance with this invention comprises essentially a substantially water-immiscible solution of nitrocellulose emulsified in disperse phase in water through the medium of an emulsifying agent. In the composition in accordance with this invention the nitro-cellulose solution, which may comprise nitrocellulose dissolved in a substantially water-immiscible solvent, or solvent mixture, or which may comprise nitrocellulose and other ingredients, such as generally used in lacquers or lacquer enamels, dissolved in a solvent or solvent mixture, is emulsified as the internal or disperse phase in water containing an emulsifying agent as the external or continuous phase.

The composition in accordance with this invention and comprising an aqueous emulsion of nitrocellulose, as indicated, is differentiated from prior compositions comprising emulsions by numerous specific characteristics which not only differentiate it from prior similar compositions, but which contribute essentially to its utility in enabling the formation of films of clarity and durability and to its characteristic of high stability.

The composition or emulsion in accordance with this invention involves as essential characteristics a specific range of concentration of nitrocellulose in the solution emulsified, a specific range of proportion of nitrocellulose solution to water and specific limitation upon the amount of emulsifying agent used. Preferably a limitation will also be imposed upon the boiling point of the solvent or solvent mixture involved in the nitrocellulose solution.

The composition or emulsion in accordance with this invention, in distinction from prior similar compositions, will be found to be capable of producing a film or coating having any desired characteristics and, at the same time, more particularly, will be capable of producing a film or coating which is clear, irrespective of whether or not the film is dried in an atmosphere of relatively high humidity. Further, the composition or emulsion will be of high stability as compared with prior similar compositions. The characteristics of the composition or emulsion, i. e. capacity to produce a clear, durable film and stability, are dependent upon the several specific limitations upon the composition generally indicated above.

The composition or emulsion in accordance with this invention will essentially involve a solution of nitrocellulose in a solvent or solvent mixture, with or without inclusion of other ingredients desired or necessary for the production of a film having desired characteristics, in which the concentration of nitrocellulose with respect to the solution will be within the range 10–40% by weight of nitrocellulose, or preferably within the narrower range 10–30% by weight. The precise range of concentration of nitrocellulose with respect to the solvent will vary within about the range 10–40%, depending upon the viscosity of the nitrocellulose used. Thus, for example, where a nitrocellulose having a viscosity of five seconds (Hercules) is used, the concentration of nitrocellulose with respect to the solution will generally be within the range 10–25%, depending upon the particular solvent or solvent mixture used and the amounts of other non-volatile ingredients, as gum or resin, pigment, etc., if any are included in the solution, while where a nitrocellulose having a viscosity of one-quarter second (Hercules) is used, the range of concentration of nitrocellulose with respect to the solution will generally be within about the range 12–40%, depending upon the particular solvent or solvent mixture used and the amounts of other non-volatile ingredients, as gum or resin, pigment, etc., if any are included in the solution. Where nitrocellulose of a viscosity higher than five seconds (Hercules) is used, the range of concentration will be fixed from 10% as a minimum, to about 40% as a maximum, depending upon viscosity, upon the particular solvent or solvent mixture used and upon the amounts of other solid ingredients, if any are included in the solution.

The composition or emulsion in accordance with this invention will essentially involve a proportion of nitrocellulose solution, nitrocellulose and solvent or solvent mixture, with, or without other ingredients, to water within about the ratio 2.0:1.0–4.0:1.0 parts by weight. The nitrocellulose solution will, of course, as has been indicated, essentially involve a nitrocellulose concentration within the range as disclosed above. Preferably, though not necessarily, the range of proportion of nitrocellulose solution to water will be on a ratio within the more narrow range 2.5:1–3:1 parts by weight.

The composition or emulsion in accordance with this invention will be found to be highly efficient for most purposes where the concentration of nitrocellulose with respect to the nitrocellulose solution is within the range 15–18% nitrocellulose and where the proportion of nitrocellulose solution to water is in a ratio within about the range 2.0:1–3.0:1.

The composition or emulsion in accordance with this invention will, in general, involve a small percentage or amount of emulsifying agent. The percentage or amount of emulsifying agent will essentially be sufficient, depending upon the particular emulsifying agent, to form an emulsion of the oil-in-water type with respect to the particular ingredients and proportions thereof as they may be in any given emulsion. In all cases essentially the emulsifier will be in amount less than the amount of nitrocellulose involved in any given emulsion. Preferably the emulsifying agent will not exceed in amount about 2% by weight on the water phase.

The emulsifying agent will be any suitable emulsifying agent which will not react, in the quantity necessary to be used, with the nitrocellulose and other ingredients which may be included in the nitrocellulose solution, so that it will not render the ultimate nitrocellulose film unsuitable for such purpose for which it may be intended, and, at the same time, one which will not materially affect the appearance and durability of the ultimate nitrocellulose film.

The composition or emulsion in accordance with this invention will preferably involve in the nitrocellulose solution emulsified a solvent or solvent mixture, i. e. solvent or mixture of solvents and a diluent or diluents, of such character that the solvent or solvent mixture will be substantially immiscible with water and characterized by the fact that at least half of the solvent or solvent mixture will boil at a temperature above about 140° C.

Compositions or emulsions in accordance with this invention may contain nitrocellulose having a wide range of viscosity characteristic and nitrogen content, depending upon the use for which they may be intended. Thus, by way of example, compositions in accordance with this invention may contain nitrocellulose of low viscosity characteristic, for example, one-quarter second or lower, or one-half second, or nitrocellulose of relatively high viscosity, for example, 15–20 seconds or even higher. It will be understood that by the term "seconds" I intend the commercial meaning of the word.

Various solvents and solvent mixtures for the nitrocellulose may be used. Desirably, the solvent or solvent mixture, or at least not less than half of the solvent or solvent mixture, will have a boiling point above about 140° C. The solvent or solvent mixture will be of such a character as to permit emulsification of the solution in water without precipitation of nitrocellulose or gum, where gum is included. A solvent or solvent mixture boiling within, for example, about the range 150-175° C. will be found to be satisfactory for general use. When an emulsion is to be dried under conditions of high relative humidity, as 85-90%, the solvent or solvent mixture will include a high boiling solvent or ingredient in order that at least half of the solvent or solvent mixture will boil above about 170° C. Thus, for example, use of a solvent mixture comprising 60% butyl lactate and 40% xylol will give a composition that will dry to a clear continuous film under a relative humidity of 85%-90%.

As illustrative of solvents which may be satisfactorily used in adapting this invention to practice, in coating non-absorbent surfaces, for example, hexyl acetate, octyl acetate, butyl butyrate, butyl lactate, amyl propionate, amyl butyrate, fenchone, methyl cyclohexanone, cyclohexanol acetate, or mixtures thereof may be used. For the coating of absorbent surfaces, for example, butyl acetate, butyl propionate, amyl acetate, etc. or mixtures thereof may be used as the solvent. Various diluents having similar characteristics from the standpoint of boiling point and which are substantially immiscible with water, such as xylol, high flash solvent naphtha, petroleum naphtha, toluol, butyl alcohol, amyl alcohol, or mixtures thereof, may be included.

Various dispersing or emulsifying agents may be used. The dispersing or emulsifying agent will be preferably soluble in water, and preferably also in the nitrocellulose solution in order that on deposit of a film it will not materially affect the appearance and durability of the film, and is, in quantity necessary to be used, compatible with, i. e., will not materially affect the appearance and durability of the dried nitrocellulose film or coating, and will not react with the nitrocellulose to render the film unsuitable for such purpose as it is intended; and is of sufficient power to produce a stable emulsion. As illustrative of dispersing or emulsifying agents, for example, a soap, as sodium oleate, ammonium linoleate, sodium resinate, ammonium oleate, etc., a sulphonated polymerized terpene, gelatin, Igepon A, Igepon T, a sulphonated oil, as sulphonated castor oil, etc., sodium, postassium, lithium, or the like, salts of the higher aliphatic sulphates, preferably containing eight or more carbon atoms, such as, for example, sodium oleyl sulphate, sodium lauryl sulphate, sodium stearyl sulphate, sodium myristyl sulphate, sodium cetyl sulphate, etc., a sodium salt of butyl or isopropyl naphthalene sulphonic acid, as sodium butyl naphthalene sulphonate, etc., oleo glycerol sulphate, methyl cellulose, the sodium salt of sulphuric ester of glycerin-mono-dodecyl ether, the sodium salt of dodecylmercapto acetic acid, etc., or other compounds equivalent therefor, as emulsifiers, will be found to be entirely satisfactory, as will also mixtures thereof. In emulsions including a pigmented nitrocellulose solution, or where a transparent film is not desired, colloidal clays, as bentonite, may be used as the emulsifier.

As has been indicated, compositions in accordance with this invention may include, in addition to nitrocellulose, various ingredients generally used in the formulation of lacquers, and lacquer enamels, or ingredients which may be desired. Thus, for example, plasticizers as dibutyl phthalate, tricresyl phosphate, triphenyl phosphate, etc., or mixtures thereof, in varying quantity may be used. Various pigments such as titanium dioxide, zinc sulphide, carbon black, chrome green, chrome yellow, toluidine red, or dyes, and preferably dyes which are soluble in water or in the nitrocellulose solution, but not in both, may be used.

The usual gums and resins, such as are used in lacquers, for example, ester gum, dammar, terpinene-maleic anhydride, and glyptal type resins, etc., may be used. In fact, most desired or heretofore known non-volatile lacquer ingredients may be included.

It will be understood that with various compositions the emulsifying agent will be used in amount not substantially in excess of that necessary to give a stable emulsion and in every case in amount less than the amount of nitrocellulose. For example, an emulsifier will usually be used in amount within about the range 0.1-2.0% by weight of the water of the emulsion.

As illustrative of the practical adaptation of this invention, for example, for the production of a coating composition in accordance therewith, a clear lacquer is made up on the following formula:

| | Per cent by weight |
|---|---|
| ½ second nitrocellulose | 22.0 |
| Dibutyl phthalate | 4.4 |
| Ester gum | 17.6 |
| Solvent mixture: | |
|   Secondary hexyl acetate 25% | |
|   Octyl acetate 25% | |
|   High flash solvent naphtha 25% | |
|   Butanol 25% | 56.0 |

The clear lacquer solution in accordance with the above formula, having a nitrocellulose content of 22%, will be mixed with water containing 0.5% sodium oleate in the proportion of 2:1 and the mixture passed through a homogenizer or colloid mill in order to emulsify the clear lacquer solution as the internal phase in the sodium oleate-water solution, which will form the external phase.

The above composition, prepared as described, will comprise a uniform stable emulsion which will be noted to have a high solids content in the lacquer phase, but which, at the same time, will be of a fluidity or viscosity enabling it to be readily sprayed or brushed, and which when dried will be productive of a clear, durable nitrocellulose film, even when dried under conditions of high humidity. The above emulsion will be productive of a clear film even when dried under a relative humidity of 85-90%, due to the substantial quantity of high boiling solvent and high diluent used (i. e., octyl acetate and high flash naphtha).

The composition or lacquer above illustrated will contain 22.0% of one-half second nitrocellulose in the lacquer phase. A lacquer composition as heretofore known and of comparable spraying or brushing capacity could not exceed a one-half second nitrocellulose content of 0-10%. It will be noted that with nitrocellulose compositions or lacquers in accordance with this invention, thicker and heavier films or coatings may be formed with a single application than with nitrocellulose lacquers heretofore known. The composition when applied to a surface, as by spraying, will, on drying, produce a clear glossy film equal in every way to lacquer films heretofore produced.

As further illustration of the practical adaptation of this invention, for example, a clear lacquer solution is made up on the following formula, using water-wet nitrocellulose carrying about 30% of water:

| | Per cent by weight |
|---|---|
| 5 second nitrocellulose | 15 |
| Water | 4.5 |
| Dibutyl phthalate | 7 |
| Dammar gum (dewaxed) | 4 |
| Solvent mixture: | |
|   Secondary hexyl acetate 65% | |
|   Butanol 10% | |
|   Xylol 25% | 74 |

100 parts of this lacquer solution is then emulsified by admixture with a solution comprising, for example, 0.5 parts sodium stearyl sulphate in 43.5 parts distilled water and passing the mixture through a homogenizer or colloid mill. The resultant mixture will be a uniform, stable emulsion, the lacquer solution being in disperse or internal phase and the composition being of relatively high solids content, but, at the same time, of desirable fluidity or viscosity enabling its application by spraying or brushing. It will be noted that the above illustrative composition includes nitrocellulose of relatively high viscosity and of a viscosity such as to prevent its use in prior lacquers in the amount indicated and, at the same time, give a lacquer which could be sprayed or brushed.

It will be noted that the five second nitrocellulose content of the lacquer phase of the above composition, amounting to 15%, substantially exceeds the maximum content, about 5% of five second nitrocellulose capable of being used in prior lacquer compositions without loss of spraying capacity. Thus, with compositions according to this invention, superior films or coatings may be obtained due to the use of relatively high viscosity nitrocellulose as compared with low viscosity nitrocellulose. In prior lacquer compositions, when five second nitrocellulose was used, a nitrocellulose content of 5% could not be exceeded without loss of spraying capacity; hence it will be observed that the above composition containing in the lacquer phase 15% of five second nitrocellulose is capable of producing with one application a film or coating of twice the thickness heretofore possible when, for example, the composition contains a lacquer water ratio of 2:1.

As further illustrative, for example, a clear lacquer composition is made up on the following formula:

| | Per cent |
|---|---|
| ¼ second nitrocellulose | 18.0 |
| Ester gum | 14.4 |
| Dibutyl phthalate | 3.6 |
| Solvent mixture: | |
|   Octyl acetate 25% | |
|   Secondary hexyl acetate 25% | |
|   High flash solvent naphtha 25% | |
|   Butanol 25% | 64.0 |

The above lacquer composition containing 18% of nitrocellulose, is then emulsified in water, containing in solution 0.5% of a sodium salt of butyl or isopropyl naphthalene sulphonic acid, in the ratio of 3:1 or 4:1, and gives a stable emulsion and one which will be effective for application by brush or spray and when dried will give a clear, durable nitrocellulose film, even when dried under conditions of high humidity. Satisfactory compositions or emulsions may be made by varying the nitrocellulose concentration of the above formula within say the range 12%–24%, with corresponding variation in the amounts of the other ingredients, and variously such lacquer solutions may be emulsified with water in a ratio within the range 2:1–4:1.

As further illustrative, lacquer solutions made up on the above formulae and on the following formulae, with variation of the nitrocellulose concentration within the range 10–40% and corresponding variations of the amounts of the other solid ingredients when emulsified with water, containing about 0.5% sodium lauryl sulphate, or equivalent salt of a higher aliphatic sulphate, such as those mentioned above, with or without the addition of about 1.0% of sulphonated castor oil, on a ratio of, for example, 2:1 or 3:1 or 4:1, will provide stable emulsions of the oil-in-water type, which may be applied to a surface by brushing, spraying, or the like, and which will produce clear, durable films of remarkable smoothness, even though dried under conditions of high humidity. Again, using 5 second nitrocellulose in the above formula in a concentration within the range 10%–18% with corresponding variations of the amounts of the other solid ingredients when emulsified in water, containing 0.5% sodium lauryl sulphate and 1.0% sulphonated castor oil, on a ratio of, for example, 2:1 or 3:1 or 4:1 will provide stable emulsions of the oil-in-water type which may be applied by brushing, spraying, or the like, and which will produce clear, durable films of remarkable smoothness, even though dried under conditions of high humidity.

As further illustrative, lacquer solutions made up on the above and in the following formulae, with variations within the indicated ranges of nitrocellulose concentration and proportions of solutions to water, will be found to produce excellent films or coatings characterized especially by almost-complete resistance to water spotting, wherein the emulsifying agent comprises about 0.5% ammonium linoleate, or other ammonium soap, and 1.0% of sulphonated castor oil. Again, excellent films, characterized by almost-complete resistance to water spotting, will be produced when the emulsifying agent comprises 0.5% of a sodium salt, for example, of butyl or isopropyl naphthalene sulphonic acid, such as sodium butyl naphthalene sulphonate.

As further illustrative, for example, a pigmented lacquer or lacquer enamel made up on, for example, the following formula

| | Parts by weight |
|---|---|
| 5 second nitrocellulose | 15 |
| Water (carried by the nitrocellulose) | 4.5 |
| Dibutyl phthalate | 6 |
| Ester gum | 12 |
| Zinc sulphide | 4.80 |
| Carbon black | 0.20 |
| Butyl butyrate | 57.0 | is emulsified as described in a solution of, for example, 0.5 parts sodium lauryl sulphate in solution in 45.5 parts by weight of distilled water. The resultant composition will be a uniform, stable emulsion with the lacquer enamel solution in disperse or internal phase. Despite the relatively high content of relatively high viscosity nitrocellulose, the emulsion will be of desired fluidity or viscosity for application by spraying or brushing. When applied to a surface, as, for example, by spraying, and dried, the resultant film will be free from precipitated nitrocellulose, free from orange peel and will take a high gloss when sanded and polished.

As a further illustration, for example, a lacquer enamel may be made up on the following formula:

| | Parts by weight |
|---|---|
| ½ second nitrocellulose | 20 |
| Water (carried by the nitrocellulose) | 6 |
| Tricresyl phosphate | 10 |
| Dammar gum (dewaxed) | 5 |
| Carbon black | 4 |
| Solvent mixture: | |
|   Monobutyl ether of ethylene glycol acetate _____ 50 % | |
|   Secondary hexyl acetate _____ 25 % | |
|   Butanol _____ 12.5% | |
|   Xylol _____ 12.5% | 65 | and the lacquer enamel emulsified in a solution comprising 0.5 parts sodium myristyl sulphate and 44 parts by weight of distilled water. Emulsification may be effected as described above by mixing the lacquer enamel solution with the aqueous solution of sodium myristyl sulphate and passing through a homogenizer or colloid mill. The emulsion will, as in the case of previous illustrations, be found to be a uniform, stable emulsion of the lacquer enamel solution in disperse or internal phase and to be of a fluidity enabling its ready application by brushing or spraying. The composition on drying will produce a film free from precipitated nitrocellulose and having desired characteristics and one which may be polished to a high gloss after light sanding.

As a still further illustration, for example, a lacquer enamel may be made up on the following formula:

| | Parts by weight |
|---|---|
| 5 second nitrocellulose | 15.0 |
| Water (carried by the nitrocellulose) | 4.5 |
| Dibutyl phthalate | 7.0 |
| Glycerol phthalate resin (lacquer type) | 4.0 |
| Para toner (pigment) | 5.0 |
| Carbon black | 0.25 |
| Secondary hexyl acetate | 74.0 | and as above described, emulsified in a solution comprising, for example, 0.5 parts of sodium lauryl sulphate and 45.0 parts by weight of distilled water. The emulsion, despite its relatively high content of relatively high viscosity nitrocellulose, will be of desired fluidity for application by spraying or brushing and on drying will produce a film comparable in desired characteristics with films produced with prior lacquer enamels.

As further illustrative and as more particularly illustrative of the adaptation of this invention in connection with compositions adaptable, more especially, for use in the forming of protective coatings and which will dry to a clear film at relatively high humidities, for example, relative humidities of 60% or more, compositions made up on the following formula will be satisfactory:

| | Per cent |
|---|---|
| 5 second nitrocellulose | 15 |
| Ester gum | 7.5 |
| Dibutyl phthalate | 3.8 |
| Solvent mixture: | |
|   Secondary hexyl acetate _____ 63% | |
|   Butyl alcohol _____ 18% | |
|   Xylol _____ 19% | 73.7 |

The lacquer according to the above formula will be emulsified by adding two parts of the lacquer to one part of distilled water containing in solution an emulsifying agent, as, for example, 0.5% of sodium lauryl sulphate, and treating in a homogenizer or colloid mill. The resultant composition will be found to dry to a continuous clear film in an atmosphere having a relative humidity of 60-65%, despite the high content of relatively high viscosity nitrocellulose contained in the lacquer phase.

Where a pigmented coating is desired, for example, 400 parts of the lacquer in accordance with the above formula and 60 parts of a pigment paste consisting of 30 parts chrome green, 15 parts butanol and 55 parts xylol are ground together for about 48 hours in a ball mill. The resultant pigmented lacquer is then, for example, emulsified with distilled water on the ratio of 2.5 parts lacquer to 1 part distilled water, the water containing a suitable emulsifying agent when may, for example, be a mixture of 0.5% sodium lauryl sulphate and 1% sulphonated castor oil. The pigmented lacquer will dry without the precipitation of nitrocellulose or clouding effect in an atmosphere having a relative humidity of 60-65%.

Where a composition is desired to give a continuous clear film under conditions of very high humidity, as, for example, 85%-90% relative humidity, such may be produced, for example, using as the lacquer phase a lacquer made up on the following formula:

| | Percent by weight |
|---|---|
| 5 second nitrocellulose | 15 |
| Ester gum | 7.5 |
| Dibutyl phthalate | 3.8 |
| Solvent mixture: | |
|   Octyl aceate _____ 25% | |
|   Secondary hexyl acetate _____ 25% | |
|   Butyl alcohol _____ 25% | |
|   Xylol _____ 25% | 73.7 |

The lacquer made up on the above formula will be emulsified in water through the use of a suitable emulsifying agent, as 0.5% sodium lauryl sulphate on the ratio of 2:5 parts lacquer to 1 part distilled water. The resultant composition will dry to a clear continuous film in an atmosphere having a humidity of 75%-80%.

For the production of compositions in accordance with this invention where it is desired to obtain a clear continuous film on drying, the solvent or solvent mixture used in the formation of the lacquer phase will be of a relatively slow evaporation rate. In general, compositions adapted for drying to a clear continuous film will contain not less than 1/3 lacquer phase to 1/3 water phase. Thus, the ratio may be 2 parts lacquer phase to 1 part water, or 2.5% lacquer phase to 1 part water phase, or even higher with respect to the lacquer phase.

Thus, compositions adapted to dry to a clear continuous film will involve not only a solvent or solvent mixture of slow evaporation rate, but also a relatively high proportion of lacquer phase to water phase.

As further illustrative and as more particularly illustrative of the adaptation of compositions in accordance with this invention to coating compositions, more especially resistant to the effects of light, weathering, etc., as, for example, automobile finishes, for example, suitable compositions may be made by utilizing lacquers made up on any one of the following formulae:

| | | | | |
|---|---|---|---|---|
| 5 second nitrocellulose | 15 | 15 | 15 | 15 |
| 28% fatty acid modified phthalic anhydride resin | 6 | 12 | 9 | -- |
| Dewaxed dammar | -- | -- | 3 | 6 |
| Dibutyl phthalate | 6 | 2.6 | 6 | 9 |
| Chrome green | 4.5 | -- | -- | -- |
| Toluidine red | -- | 3 | -- | -- |
| Carbon black | -- | -- | 2.25 | 0.7 |
| Butanol | 2.25 | -- | 13 | -- |
| Xylol | 8.25 | -- | -- | -- |
| Toluol | -- | -- | 5.5 | -- |
| Secondary hexyl acetate | 58 | 82.4 | 57 | 84.3 |
| | 100.0 | 115.0 | 110.75 | 115.0 |

Lacquers made up on the above formulae may be emulsified by admixture with water containing a suitable emulsifying agent, as, for example, 0.5% sodium lauryl sulphate, on the basis of 100 parts of lacquer to say 40–50 parts of water, and treatment in a homogenizer or colloid mill.

As further illustrative of compositions in accordance with this invention and more particularly compositions adaptable for use in finishing furniture, for example, a satisfactory composition may be prepared on the following formula:

| | Percent by weight |
|---|---|
| 5 second nitrocellulose | 10.7 |
| Ester gum | 8.5 |
| Dibutyl phthalate | 4.3 |
| Solvent mixture: | |
|   Butanol | 10 |
|   Xylol | 25 |
|   Secondary hexyl acetate 65 | 48.0 |
| 0.5% solution of sodium lauryl sulphate in distilled water | 28.5 |

Emulsification of the lacquer phase in the water will be effected by mixing the lacquer and water together and treating in a homogenizer or colloid mill.

The compositions illustrated above may be variously applied to absorbent or to non-absorbent surfaces. When any of the above compositions are to be applied to absorbent surfaces, water-immiscible solvents or solvent mixtures of somewhat lower boiling point or higher rate of evaporation may be substituted for those indicated in the general formulae.

In making up compositions or emulsions embodying this invention, it will be found desirable though not essential to utilize emulsifiers free from inorganic impurities. Thus, for example, it will be desirable where an emulsifier is used which in its commercial form contains inorganic impurities, to separate the emulsifier from the impurities by dissolving the emulsifier in a solvent for the emulsifier which is a non-solvent for the inorganic impurities and thereby effect substantial separation of impurities. By way of example, where sodium lauryl sulphate is used as the emulsifying agent, it may desirably be used after treatment with methyl alcohol, for example, in a Soxhlet extractor, the solvent being ultimately removed by evaporation for recovery of the purified emulsifier.

Further, where the nitrocellulose or lacquer solution is of the pigmented type, it will be desirable, though not essential, that the pigment be extracted for the removal of water-soluble components. Extraction of water-soluble components from pigments variously may, for example, be accomplished by extraction with distilled water in a Soxhlet extractor. The use of emulsifiers substantially free from inorganic impurities and of pigments, where such are used, substantially free from water-soluble components will result in the production of compositions or emulsions in accordance with this invention of superior stability.

In the drying of coating compositions in accordance with this invention applied to a non-absorbent surface, such as a metal surface, for example, by spraying, brushing, dipping, or the like, the water content of the composition or emulsion will be first removed, together with more or less solvent, depending upon the particular solvent used, for example, by evaporation, such being readily accomplished due to the use of solvent or solvent mixture of slower evaporation rate than that of water. After removal of the water the solvent or residual solvent will be removed, as by evaporation, to effect normal deposit of a nitrocellulose film.

In the drying of coating compositions in accordance with this invention, applied to an absorbent surface, such as paper, bare wood, or the like, for example, by spraying, brushing, dipping, or the like, the water content of the composition or emulsion will be first removed by absorption or by absorption and evaporation and the film or coating finally dried.

After the removal of the water from the composition after its application, the solvent or solvent mixture will be evaporated with normal deposit of the film comprising nitrocellulose and such other ingredients as may have been incorporated therewith, such as plasticizer, gum or resin, pigment, etc.

The films or coatings produced with compositions in accordance with this invention will be of superior characteristics, such as freedom from precipitated nitrocellulose, clarity when unpigmented, resistance to light, storage, weathering, resistance to abrasion, resistance to water, flexibility, etc.

In connection with this invention and more particularly with respect to the claims appended hereto, it will be understood that the term "lacquer" includes broadly any nitrocellulose solution with or without components in addition to nitrocellulose such as, for example, a plasticizer, a gum or resin, a pigment, etc., ingredients heretofore commonly used in coating compositions of the type generally known as lacquers. It will be understood that the terms "lacquer" and "lacquer enamel" used herein are, from the broad standpoint, used synonymously, the terms being differentiated from the specific standpoint only by the fact that the term "lacquer enamel" indicates a pigmented composition as compared to indication of an unpigmented composition by the term "lacquer".

This application is a continuation in part of my application for United States Patent, Serial No. 703,833, filed December 23, 1933.

What I claim and desire to protect by Letters Patent is:

1. A composition including a substantially water-immiscible nitrocellulose lacquer solution having a concentration of nitrocellulose within the range 10%–40% emulsified in disperse phase in water on a ratio of nitrocellulose solution to water within the range 2:1–4:1, by weight, through the medium of an emulsifying agent which is non-reactive with nitrocellulose and in amount less than the amount of nitrocellulose in the emulsion, the emulsion being characterized by the fact that it is stabilized by mechanical treatment, as by treatment with a colloid mill or homogenizer.

2. A composition including a substantially water-immiscible nitrocellulose lacquer solution having a concentration of nitrocellulose within the range 10%–40% and not less than half of the volatile portion of which has a boiling point above about 140° C. emulsified in disperse phase in water on a ratio of nitrocellulose solution to water within the range 2:1–4:1, by weight, through the medium of an emulsifying agent which is non-reactive with nitrocellulose and in amount less than the amount of nitrocellulose in the emulsion, the emulsion being characterized by the fact that it is stabilized by mechanical treatment, as by treatment with a colloid mill or homogenizer.

3. A composition including a substantially water-immiscible nitrocellulose lacquer solution having a concentration of nitrocellulose within the range 12–24% and not less than half of the volatile portion of which has a boiling point above about 140° C. emulsified in disperse phase in water on a ratio of nitrocellulose solution to water within the range 2:1–3:1, by weight, through the medium of an emulsifying agent which is non-reactive with nitrocellulose and in amount less than the amount of nitrocellulose in the emulsion, the emulsion being characterized by the fact that it is stabilized by mechanical treatment, as by treatment with a colloid mill or homogenizer.

4. A composition including a substantially water-immiscible nitrocellulose lacquer solution having a concentration of nitrocellulose within the range 12–24% and not less than half of the volatile portion of which has a boiling point above about 140° C. emulsified in disperse phase in water on a ratio of nitrocellulose solution to water within the range 2:1–4:1, by weight, through the medium of an emulsifying agent which is non-reactive with nitrocellulose and in amount less than the amount of nitrocellulose in the emulsion, the emulsion being characterized by the fact that it is stabilized by mechanical treatment, as by treatment with a colloid mill or homogenizer.

5. A composition including a substantially water-immiscible nitrocellulose lacquer solution having a concentration of nitrocellulose within the range 10%–40% and not less than half of the volatile portion of which has a boiling point above about 140° C. emulsified in disperse phase in water on a ratio of nitrocellulose solution to water within the range 2:1–4:1, by weight, through the medium of a water soluble emulsifying agent which is non-reactive with nitrocellulose and in amount less than the amount of nitrocellulose in the emulsion, the emulsion being characterized by the fact that it is stabilized by mechanical treatment, as by treatment with a colloid mill or homogenizer.

6. A composition including a substantially water-immiscible nitrocellulose lacquer solution having a concentration of nitrocellulose within the range 10%–40% and not less than half of the volatile portion of which has a boiling point above about 140° C. emulsified in disperse phase in water on a ratio of nitrocellulose solution to water within the range 2:1–4:1, by weight, through the medium of an emulsifying agent which is soluble in water and in the solution of nitrocellulose and non-reactive with nitrocellulose and in amount less than the amount of nitrocellulose in the emulsion, the emulsion being characterized by the fact that it is stabilized by mechanical treatment, as by treatment with a colloid mill or homogenizer.

7. A composition including a substantially water-immiscible nitrocellulose lacquer solution having a concentration of nitrocellulose within the range 10%–40% and not less than half of the volatile portion of which has a boiling point above about 140° C. emulsified in disperse phase in water on a ratio of nitrocellulose solution to water within the range 2:1–4:1, by weight, through the medium of an emulsifying agent which is free from inorganic impurities and non-reactive with nitrocellulose and in amount less than the amount of nitrocellulose in the emulsion, the emulsion being characterized by the fact that it is stabilized by mechanical treatment, as by treatment with a colloid mill or homogenizer.

CLEVELAND B. HOLLABAUGH.